US009207585B2

(12) United States Patent
Hatano et al.

(10) Patent No.: US 9,207,585 B2
(45) Date of Patent: Dec. 8, 2015

(54) ENDLESS BELT, BELT DRIVING DEVICE AND IMAGE FORMING APPARATUS

(71) Applicant: CANON KABUSHIKI KAISHA, Tokyo (JP)

(72) Inventors: Fukashi Hatano, Abiko (JP); Takashi Seki, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/096,116

(22) Filed: Dec. 4, 2013

(65) Prior Publication Data

US 2014/0161495 A1 Jun. 12, 2014

(30) Foreign Application Priority Data

Dec. 7, 2012 (JP) ................................ 2012-268330
Dec. 7, 2012 (JP) ................................ 2012-268331
Dec. 7, 2012 (JP) ................................ 2012-268332

(51) Int. Cl.
*G03B 15/16* (2006.01)
*G03G 15/16* (2006.01)

(52) U.S. Cl.
CPC .......... *G03G 15/1615* (2013.01); *G03G 15/162* (2013.01)

(58) Field of Classification Search
CPC .......................... G03G 15/754; G03G 15/755
USPC ........................................................ 399/162
See application file for complete search history.

(56) References Cited

U.S. PATENT DOCUMENTS

| | | | | |
|---|---|---|---|---|
| 5,956,553 | A | 9/1999 | Park | |
| 6,055,396 | A | 4/2000 | Pang | |
| 6,141,522 | A * | 10/2000 | Tsuruoka et al. | 399/302 |
| 6,962,637 | B2 | 11/2005 | Takeuchi et al. | |
| 7,460,815 | B2 | 12/2008 | Kamoshida et al. | |
| 8,409,485 | B2 | 4/2013 | Yashiki et al. | |
| 2012/0242032 | A1 | 9/2012 | Sawanaka et al. | |
| 2013/0322934 | A1 | 12/2013 | Hatano | |

FOREIGN PATENT DOCUMENTS

| | | | |
|---|---|---|---|
| CN | 1205943 | A | 1/1999 |
| CN | 1210076 | A | 3/1999 |

(Continued)

OTHER PUBLICATIONS

Chinese Office Action dated Aug. 20, 2015, in related Chinese Patent Application No. 201310655796 (with English translation).

*Primary Examiner* — Clayton E LaBalle
*Assistant Examiner* — Noam Reisner
(74) *Attorney, Agent, or Firm* — Fitzpatrick, Cella, Harper & Scinto

(57) ABSTRACT

An endless belt includes an endless belt body, and a plurality of first tapes each wound around an outer peripheral surface of the belt body. Each of the first tapes has a length shorter than a full circumference of the endless belt, and the first tapes are superposedly applied onto the belt body so that positions of first edges of the first tapes and positions of second edges of the first tapes are different from each other, respectively. A recessed portion is formed in a region between the first edges and the other edges second. In addition, a second tape having a length longer than the length of a full circumference of the endless belt is wound around the first tapes so as to extend along the recessed portion, wherein a winding end edge of the second tape overlaps a winding start edge of the second tape.

19 Claims, 11 Drawing Sheets

(56) References Cited

FOREIGN PATENT DOCUMENTS

| | | | |
|---|---|---|---|
| CN | 1378912 | A | 11/2002 |
| CN | 1971437 | A | 5/2007 |
| CN | 101923309 | A | 12/2010 |
| JP | 2002-068513 | A | 3/2002 |

* cited by examiner

ENDLESS BELT, BELT DRIVING DEVICE AND IMAGE FORMING APPARATUS

FIELD OF THE INVENTION AND RELATED ART

The present invention relates to an endless belt for use with an image forming apparatus such as a printer or a copying machine, and a belt driving device for moving and driving the endless belt, and relates to the image forming apparatus using the belt driving device.

Among conventional image forming apparatuses, such as printers and copying machines, there is an image forming apparatus employing the endless belt, such as an intermediary transfer belt or a recording material conveyance belt.

In such an image forming apparatus including the endless belt, there is a need to limit lateral shift (lateral deviation) of the belt generated during belt drive. The lateral shift of the belt (lateral belt shift) means that the endless belt moves in a widthwise direction perpendicular to a conveyance direction (rotational direction) of the endless belt.

In order to enhance a lateral belt shift-limiting effect, in the case where a reinforcing tape is wound around the endless belt through a plurality of full circumference at each of end portions with respect to a widthwise direction of a belt body of the endless belt, there is a possibility of an occurrence of a phenomenon that the reinforcing tape is peeled from the belt body at a stepped portion which is a seam of the reinforcing tape. This is because when the reinforcing tape passes through a portion, such as a stretching roller, where a radius of curvature is small, a difference in length between an outer peripheral portion and an inner peripheral portion is generated and thus a force acts in a direction in which the reinforcing tape is peeled off.

Further, also in the case where a seal member or the like provided at an end portion of a belt cleaning device is contacted to the belt from the outer peripheral portion side of the belt, a force of constraint acts on the outer peripheral portion, so that the reinforcing tape is liable to be peeled off from the belt body. When the endless belt is further driven and moved in a peeled state of the reinforcing tape, a compressive force acts on the inner peripheral portion of the belt when the belt passes through the portion where the radius of curvature is small, so that the belt body can cause buckling deformation. During repetition of the buckling deformation in such a manner, there is a fear that a problem such that the endless belt is broken is generated.

Therefore, in Japanese Laid-Open Patent Application (JP-A) 2002-68513, a belt driving device constituted so as to solve the problem is proposed. In this driving device, as shown in FIG. 10, a reinforcing tape 56 is wound around an endless belt 50 without superposing longitudinal end portions with respect to a widthwise direction perpendicular to a circumferential direction (circulating direction: arrow H direction). The end portions, of the reinforcing tape 56, which are spaced from each other without being superposed are inclined with respect to the circumferential direction (arrow H direction) and are connected by a seam reinforcing film 57 applied onto the inclined end portions.

However, according to the belt driving device described in JP-A 2002-68513, an effect of preventing breaking of the endless belt was small. That is, when the endless belt passes through the portion, such as the stretching roller, where the radius of curvature is small, such a phenomenon that the difference in length between the outer peripheral portion and the inner peripheral portion occurs as before, but the obliquely cut end portions of the reinforcing tape 56 are connected by the seam reinforcing film 57 applied onto the reinforcing tape 56. For that reason, deformation of the belt body and the reinforcing tape is suppressed, so that the difference in length between the outer peripheral portion and the inner peripheral portion cannot be absorbed. As a result, there is a fear that an inconvenience such that the reinforcing tape is peeled from the belt body is caused.

When the reinforcing tape is peeled from the belt body, there is a fear that the belt body positioned at the inner peripheral portion is broken by repetitively causing the buckling deformation. Further, in the case where the seal member or the like provided at the end portion of the belt cleaning device is contacted to the endless belt from the outer peripheral portion side of the endless belt, there is a possibility that a problem such that also the seam reinforcing film 57 is peeled.

SUMMARY OF THE INVENTION

According to an aspect of the present invention, there is provided an endless belt comprising: an endless belt body; and a tape which is wound around the endless belt body through more than full circumference on an outer peripheral surface of each of end portions of the endless belt body with respect to a widthwise direction crossing a circumferential direction of the endless belt body and which is provided so that the tape overlaps a winding start portion with a slack These and other objects, features and advantages of the present invention will become more apparent upon a consideration of the following description of the preferred embodiments of the present invention taken in conjunction with the accompanying drawings.

DESCRIPTION OF THE EMBODIMENTS

Figure 1:
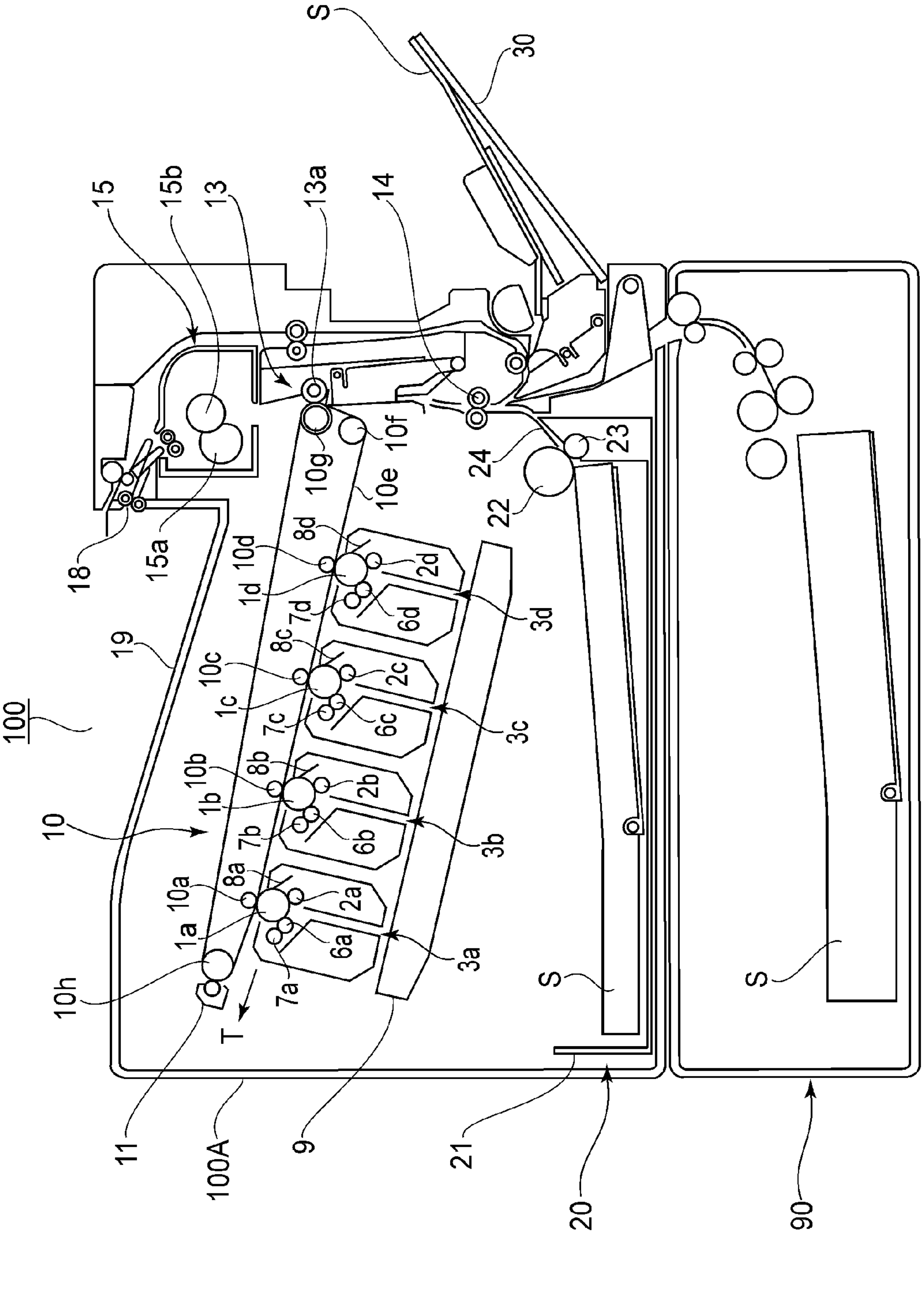
FIG. 1 is a schematic sectional view showing a general structure of an image forming apparatus in Embodiment 1.

FIG. 1 is a schematic sectional view of an image forming apparatus including an intermediary transfer belt unit 10 in this embodiment. In this embodiment, as an example of the image forming apparatus, a laser beam printer 100 will be described.

[General Structure of Laser Beam Printer]

The laser beam printer 100 includes an apparatus main assembly 100A in which the intermediary transfer belt unit 10 is provided at an upper portion thereof. Under the intermediary transfer belt unit 10, four image forming portions 3*a*, 3*b*, 3*c* and 3*d* provided from an upstream side toward a downstream side along a rotational direction (counterclockwise direction in FIG. 1) of an intermediary transfer belt M (FIG. 2) are disposed.

Figure 2:
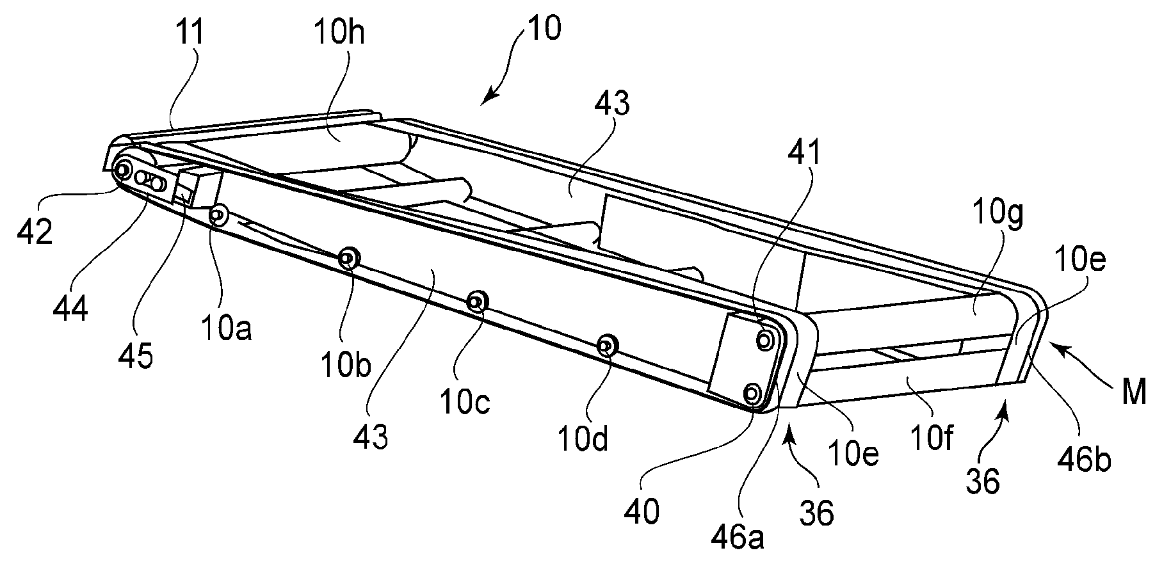
FIG. 2 is a perspective view of an intermediary transfer belt unit in Embodiment 1.
Figure 3:
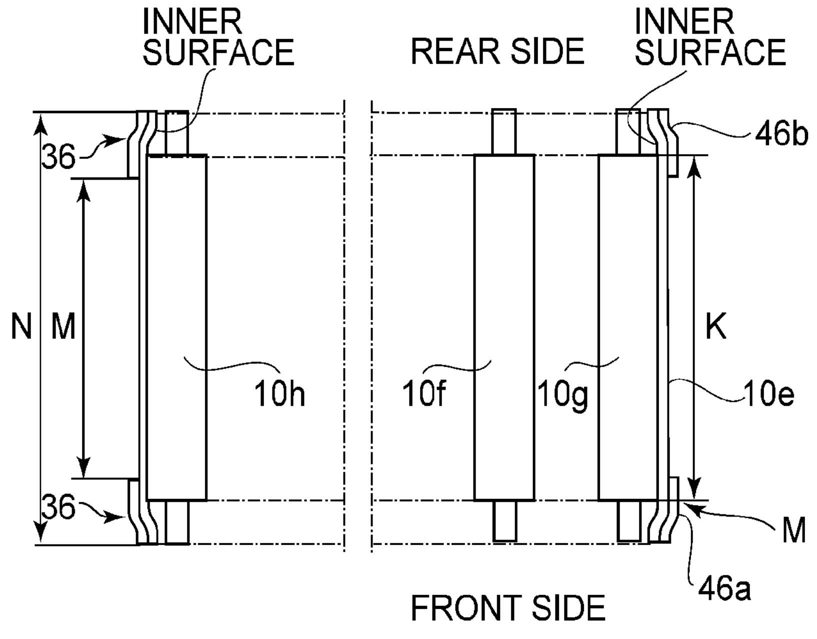
FIG. 3 is a plan view of the intermediary transfer belt unit in Embodiment 1.

In the intermediary transfer belt unit 10, the intermediary transfer belt M as an endless belt is stretched by a driving roller 10*g*, a follower roller 10*f* and a tension roller 10*h* which are arranged in a predetermined positional relationship. The intermediary transfer belt M includes an endless belt body 10*e* and a reinforcing portion 36. The reinforcing portion 36 reinforces the belt body 10*e*, at each of end portions with respect to a widthwise direction (front-rear direction of FIG. 4) perpendicular to a circumferential direction J (FIG. 4), by reinforcing tapes 46 (46*a*, 46*b*) wound around and applied onto an outer peripheral surface of the belt body 10*e* (FIGS. 2 and 3).

The belt body 10*e* of the intermediary transfer belt M is urged from a back surface side by primary transfer rollers 10*a*, 10*b*, 10*c* and 10*d*, so that a (front) surface of the belt body 10*e* is contacted to photosensitive drums 1*a*, 1*b*, 1*c* and 1*d* of the image forming portions 3*a*, 3*b*, 3*c* and 3*d*. To the belt body 10*e*, tension is applied in an arrow T direction in FIG. 1 by the tension roller 10*h*.

The primary transfer rollers 10*a* to 10*d* are provided inside the intermediary transfer belt M so as to oppose the photosensitive drums 1*a* to 1*d*, respectively. To each of the primary transfer rollers 10*a* to 10*d*, a transfer bias is applied by an unshown bias application means.

By the above-described constitution, between the intermediary transfer belt M and each of the photosensitive drums 1*a* to 1*d*, a primary transfer nip as a primary transfer portion is formed. The intermediary transfer belt M is rotated in the same direction as the counterclockwise direction, as the rotational direction of the driving roller 10*g* also functioning as a secondary transfer opposite roller, with rotation of the driving roller 10*g*. A rotational speed of the intermediary transfer belt M is set at a value substantially equal to the rotational speed (process speed) of the respective photosensitive drums 1*a* to 1*d*.

The image forming portions 3*a*, 3*b*, 3*c* and 3*d* have constitutions for forming toner images of colors of yellow, magenta, cyan and black, respectively. The image forming portions 3*a* to 3*d* includes the photosensitive drums 1*a* to 1*d*, respectively, which are electrophotographic photosensitive members as latent image bearing members. Each of the photosensitive drums 1*a* to 1*d* is constituted so as to be rotationally driven in the clockwise direction in FIG. 1.

At peripheral portions of the photosensitive drums 1*a* to 1*d*, along the rotational direction of the photosensitive drums 1*a* to 1*d*, primary chargers 2*a*, 2*b*, 2*c* and 2*d* as charging means and developing devices 6*a* (7*a*), 6*b* (7*b*), 6*c* (7*c*) and 6*d* (7*d*) as developing means are provided in this order, respectively. Further, at the peripheral portions of the photosensitive drums 1*a* to 1*d*, along the rotational direction of the photosensitive drums 1*a* to 1*d*, the primary transfer rollers 10*a*, 10*b*, 10*c* and 10*d* as primary transfer means and cleaning blades 8*a*, 8*b*, 8*c* and 8*d* as photosensitive member cleaning means are provided in this order, respectively. Below the image forming portions 3*a*, 3*b*, 3*c* and 3*d*, an exposure device 9 as a latent image forming means for the image forming portions 3*a* to 3*d* is provided.

On the surface of the intermediary transfer belt M, a secondary transfer roller 13*a* is provided in an opposing position to the driving roller 10*g*. The secondary transfer roller 13*a* sandwiches the intermediary transfer belt M between the secondary transfer roller 13*a* and the driving roller 10*g*. A secondary transfer portion 13 is formed by a secondary transfer nip between the secondary transfer roller 13*a* and the intermediary transfer belt M.

At the secondary transfer portion 13, the toner images formed on the intermediary transfer belt M are transferred onto a recording material S sent from a feeding portion 20 or a feeding portion 90. To the secondary transfer roller 13*a* of the secondary transfer portion 13, a bias of a positive polarity is applied. By applying the positive-polarity bias to the secondary transfer portion 13 via the secondary transfer roller 13*a*, the four color toner images on the belt body 10*e* of the intermediary transfer belt M are secondary-transferred onto the recording material S conveyed by a registration roller pair 14.

Further, on the surface of the intermediary transfer belt M, a belt cleaning device 11 as an intermediary transfer member cleaner is provided in contact with the surface of the intermediary transfer belt M in an opposing position to the tension roller 10*h*.

Above the secondary transfer portion 13, a fixing device 15 constituted by a fixing roller 15*a* and a pressing roller 15*b* is provided. The recording material S on which the toner images are transferred is conveyed to a nip between the fixing roller 15*a* and the pressing roller 15*b*, and is heated and pressed by the fixing roller 15*a* and the pressing roller 15*b*, so that the transferred toner images are fixed on the surface of the recording material S.

At a lower portion of the apparatus main assembly 100A, the feeding portion 20 for accommodating a sheet feeding cassette in which sheets of the recording material S to be subjected to image formation are stacked is provided, and below the feeding portion 20, a feeding portion 90 in which sheets of the recording material S are stacked is provided.

At the feeding portion 20, the sheets of the recording material S are fed into a feeding passage 24 one by one via a feeding roller (conveying roller) 22 and a retard roller 23, and then is supplied to the secondary transfer portion 13 via a feeding and conveying device including the registration roller pair 14 and the like.

In a downstream side along the conveyance direction of the recording material S, the fixing device 15 including the fixing roller 15*a* and the pressing roller 15*b* pressed against the fixing roller 15*a* is disposed. Further, in the downstream side of the fixing device 15, a sheet discharging roller pair 18 and a sheet discharge tray 19 are provided. Incidentally, a manual tray 30 is provided as shown in FIG. 1.

In the laser beam printer 100 having the above-described constitution, the toner images formed on the photosensitive drums 1*a* to 1*d*, respectively, are successively primary-transferred onto the belt body 10*e* of the intermediary transfer belt M rotated in the counterclockwise direction.

The transfer of the toner images from the photosensitive drums 1*a* to 1*d* onto the intermediary transfer belt M is made by applying a positive bias to each of the primary transfer rollers 10*a* to 10*d*. The thus-formed toner images on the belt body 10*e* of the intermediary transfer belt M in a state in which the four color toner images are superposed are moved to the secondary transfer portion 13.

On the other hand, the toners remaining on the surfaces of the photosensitive drums 1*a* to 1*d* after the toner image transfer are removed by cleaning blades 8*a* to 8*d*, respectively. Further, the toner remaining on the belt body 10*e* of the intermediary transfer belt M after the secondary transfer onto the recording material S is removed by a belt cleaning device 11. The removal toner is collected in a toner collecting container (not shown) via a toner collection conveying path (not shown).

[Intermediary Transfer Roller]

Next, the intermediary transfer belt unit 10 will be described with reference to FIG. 2. FIG. 2 is a perspective view showing the intermediary transfer belt unit 10 in this embodiment. Incidentally, in FIG. 2, in order to facilitate visual recognition of an inside of the intermediary transfer belt unit 10, for convenience, only end portions of the intermediary transfer belt M is illustrated by omitting a central portion of the intermediary transfer belt M.

As shown in FIG. 2, the intermediary transfer belt 10 is constituted so as to extend in a left-right direction in FIG. 2 and is provided with an intermediary transfer belt main frame 43, at each of widthwise end portions, each extending in a longitudinal direction. The intermediary transfer belt unit 10 includes the driving roller 10*g*, the follower roller 10*f* and the tension roller 10*h* which are used as a plurality of stretching rollers for stretching the intermediary transfer belt unit 10.

The driving roller 10*g*, the follower belt 10*f* and the tension roller 10*h* stretch the wound endless intermediary transfer belt M in a state in which these rollers are rotatably supported at end portions with respect to axial directions thereof by bearings 41, 40 and 42, respectively. Onto the intermediary transfer belt M, reinforcing tapes 46 (46*a* and 46*b*) are applied at the widthwise end portions while extending in a circumferential direction. Incidentally, in FIG. 2, only shaft portions of the primary transfer rollers 10*a*, 10*b*, 10*c* and 10*d* in FIG. 1 are represented by 10*a*, 10*b*, 10*c* and 10*d* while omitting the roller portions from illustration.

The driving roller 10*g* is supported by the intermediary transfer belt main frames 43 via the bearing 41 and is rotated by transmitting a driving force thereto from an unshown driving means, thus rotationally drive the intermediary transfer belt M in the circumferential direction. The surface of the driving roller 10*g* is formed by a rubber layer having high friction coefficient in order to convey the intermediary transfer belt M with no slide.

Figure 4:
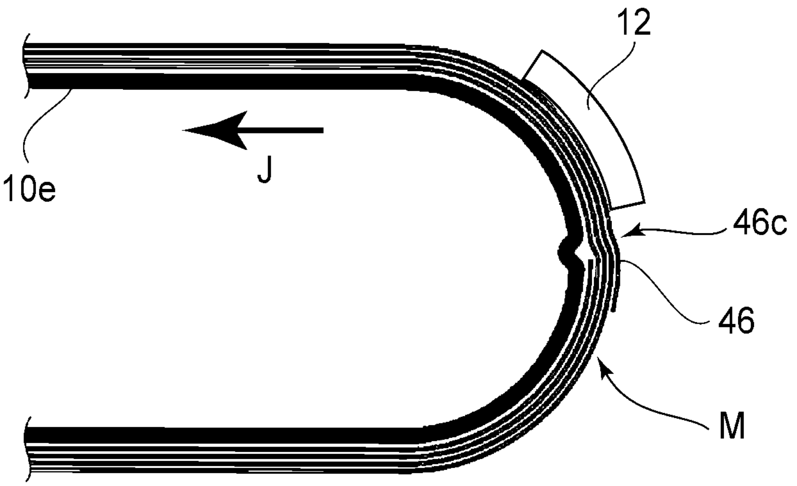
FIG. 4 is an illustration showing belt buckling generated due to a difference in length between an outer peripheral portion and an inner peripheral portion at a curved portion in Embodiment 1.

The follower roller 10*f* is supported by the intermediary transfer belt main frames 43 via the bearing 40 and is rotated by rotation of the intermediary transfer belt 10*e* member in a circumferential direction J (FIG. 4).

The tension roller 10*h* is slidably supported, relative to the intermediary transfer belt main frame 43, by the intermediary transfer belt main frame 43 together with tension roller supporting side plates 44 via the bearing 42. The tension roller 10*h* urges and stretches the intermediary transfer belt M, in a direction in which the intermediary transfer belt M is spaced from the intermediary transfer belt main frames 43, by a spring force of a tension spring 45 constituted by a compression spring.

The intermediary transfer belt unit 10 having the above-described constitution constitutes a belt driving device including the intermediary transfer belt M as the endless belt, and the driving roller 10*g*, the follower roller 10*f* and the tension roller 10*h* which are used as the plurality stretching rollers for stretching the intermediary transfer belt M. By this belt driving device, the intermediary transfer belt M is rotated in the circumferential direction J (FIG. 4) by drive of the driving roller 10*g*.

A base layer of the belt body 10*e* is formed with polyimide (PI), polyvinylidene fluoride (PVDF), polyphenylene sulfide (PPS) polyether ether ketone (PEEK), polyethylene naphthalate (PEN) or the like. These materials forming the base layer are constituted by a resin-based material having high tensile strength. In many cases, from factors such as molding, strength and less deformation, the base layer is formed in a thickness from e.g., 40 μm to 100 μm. Further, in order to enhance a transfer efficiency of the toner, an intermediary transfer belt having a multi-layer structure in which different layers such as a rubber layer are applied over the whole outer peripheral surface of the base layer is also present. The belt body 10*e* of the intermediary transfer belt M according to this embodiment also have any of these constitutions.

[Lateral Belt Shift Limiting Constitution]

Next, a lateral belt shift limiting constitution will be described with reference to FIG. 3. FIG. 3 is a plan (top) view showing the intermediary transfer belt unit 10 in this embodiment.

In this embodiment, onto the outer peripheral surface of the belt body 10*e* at the end portions, the reinforcing tapes 46 (46*a*, 46*b*) are applied over the belt rotational direction (circumferential direction), so that the lateral belt shift is prevented (limited) by these reinforcing tapes 46*a* and 46*b*.

Each of the reinforcing tapes 46*a* and 46*b* may only be required to have a width of 2 to 3 mm or more and may have any width so long as a space is ensured. Further, the thickness of each of the reinforcing tapes 46*a* and 46*b* may also be any value of, e.g., 10 μm or more. Further, the widths and thicknesses of the reinforcing tapes 46*a* and 46*b* may also be different from each other, and the reinforcing tapes 46*a* and 46*b* are provided by using different materials.

As the reinforcing tapes 46*a* and 46*b*, in addition to the resin-based material such as polyester, similarly as in the case of the base layer of the belt body 10*e*, a film adhesive tape of polyimide (PI) or the like is used. Basically, any material may be used so long as the material has sufficient tensile strength. Further, as an adhesive material, a general-purpose material of an acrylic type or a silicone type can be used.

With a higher tensile strength of the reinforcing tapes 46*a* and 46*b*, a lateral belt shift-limiting (preventing) effect is enhanced. However, the belt body 10*e* is relatively hard, the effect is lowered. For that reason, in the case where the tensile strength of the reinforcing tapes 46*a* and 46*b* is low or the case where the material for the belt body 10*e* is very hard, the structure of the reinforcing tapes 46*a* and 46*b* is constituted so as to have certain width and height. In actuality, the reinforcing tapes 46*a* and 46*b* are practical when they are formed of a material, having the same Young's modulus as that of the belt body 10*e*, in the thickness from 20 μm to 50 μm with the width of about several mm.

Further, in order to further enhance the lateral belt shift-limiting effect, the inner peripheral length of the portion where the reinforcing tapes 46*a* and 46*b* are applied is, as shown in FIG. 3, made shorter than the inner peripheral length of the portion where the reinforcing tapes 46*a* and 46*b* are not applied. Herein, the inner peripheral length refers to an average inner peripheral length (averaged inner peripheral length in the belt widthwise direction, i.e., a driving device perpendicular to the circumferential direction) at each of the portion where the reinforcing tapes 46*a* and 46*b* are provided and the portion where the reinforcing tapes 46*a* and 46*b* are not provided. Accordingly, the inner peripheral length does not refer to a partial inner peripheral length due to minute unevenness.

In FIG. 3, sizes and the like of the intermediary transfer belt M and the reinforcing tapes 46*a* and 46*b* are illustrated in an exaggerated manner for ease of understanding. In actuality, the difference in inner peripheral length between the portion where the reinforcing tapes 46*a* and 46*b* are provided and the portion where the reinforcing tapes 46*a* and 46*b* are not provided is very slight. The inner peripheral length difference is not a size to the extent that it can be clearly recognized by eye observation. In the case where the reinforcing tapes 46*a* and 46*b* are provided so as to provide the inner peripheral length difference, the reinforcing tape 46 may preferably be applied while being sufficiently pulled under application of back tension. As the pulling force is strengthened, the inner peripheral length difference becomes large, so that the lateral belt shift-limiting effect in this embodiment is further enhanced.

The reinforcing tape 46 is applied in this way, and then by appropriately setting a thrust length (axial direction length) of each of the follower roller 10*f*, the driving roller 10*g* and the tension roller 10*h*, the effect can be sufficiently achieved. For example, a dimension M from an inner end (edge) surface of one reinforcing tape 46*a* to an inner end surface of the other reinforcing tape 46*b* (dimension between the inner end surfaces) with respect to the belt widthwise direction is made shorter than a contact dimension K of a region in which the belt body 10*e* is contacted to any of the rollers 10*f*, 10*g* and 10*h*. Further, a dimension N from an outer end (edge) surface of one reinforcing tape 46*a* to an outer end surface of the other reinforcing tape 46*b* (dimension between the outer end surfaces) with respect to the belt widthwise direction is made longer than the contact dimension K of the region in which the belt body 10*e* is contacted to any of the rollers 10*f*, 10*g* and 10*h*). Particularly, when the thrust length is set so that the end portions of the driving roller 10*g* ride over the portions where the reinforcing tapes 46*a* and 46*b* are applied, the lateral belt shift-limiting effect is high.

Thus, when the thrust lengths of the rollers 10*f* to 10*h* and the spacing between the reinforcing tapes 46*a* and 46*b* are properly set, it is possible to create a difference in belt rotation period (cycle) between the reinforcing tapes 46*a* and 46*b* during the lateral shift of the belt body 10*e* toward one side. By the created difference in belt rotation period, the lateral shift of the belt body 10*e* is limited, so that the center of the intermediary transfer belt M is returned to a central position.

For example, assuming that the belt body 10*e* is shifted and thus an amount of ride of the reinforcing tape 46*a* over the end portion of the driving roller 10*g* is large, a period (cycle) of one rotation in the reinforcing tape 46*a* side is earlier than a period of one rotation in the reinforcing tape 46*b* side.

As a result, the belt body 10*e* is slightly inclined obliquely relative to the driving roller 10*g*, and by the inclination, the belt body 10*e* is gradually moved in a direction in which the amount of ride of the reinforcing tape 46*a* is decreased. That is, the center of the intermediary transfer belt M is gradually returned to the central position. On the other hand, also in the case where the belt body 10*e* is shifted and thus the amount of ride of the reinforcing tape 46*b* is large, a similar phenomenon occurs.

In this way, even when the belt body 10*e* is shifted in either of the two directions, action such that the intermediary transfer belt M is returned to the central position is exerted on the intermediary transfer belt M.

In order to enhance the lateral belt shift-limiting effect, as described above, the application of the reinforcing tape 46 under application of the back tension is effective. In addition, winding of the reinforcing tape through many full circumferences, use of a thick tape and winding of a tape having high tensile strength are effective.

Figure 5:
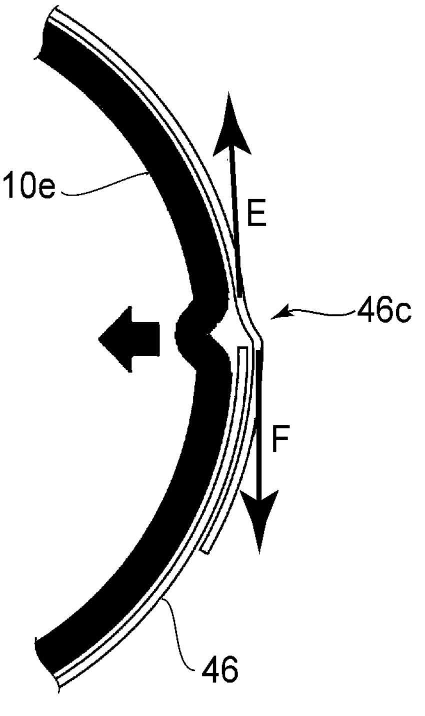
FIG. 5 is an illustration showing forces acting on a reinforcing tape at the curved portion in Embodiment 1.

However, with a higher degree of enhancement of the limiting effect as described above, there is a higher possibility that the reinforcing tape 46 is peeled from the belt body 10*e*. FIGS. 4 and 5 are illustrations each showing a phenomenon that the reinforcing tape 46 is peeled from the belt body 10*e* at a stepped portion 46*c* which is a seam of the reinforcing tape 46 (46*a*, 46*b*).

As shown in FIGS. 4 and 5, when the intermediary transfer belt M in a state in which the reinforcing tape 46 is applied onto the intermediary transfer belt M is slackened at the stepped portion 46*c* constituting the seam, by the slack, a difference in length is generated between the outer peripheral portion and the inner peripheral portion. In this case, as a radius of curvature at the slack portion is smaller, the difference in length between the outer peripheral portion and the inner peripheral portion becomes larger.

In order to absorb such a difference in length, forces in stretching direction (arrow E and F directions in FIG. 5) act on the reinforcing tapes 46 at the outer peripheral portion, and forces in compressing direction act on the belt body 10*e*. However, when there is the stepped portion 46*c* as the seam of the reinforcing tape 46, in addition to the exertion of the stretching forces in a tangential direction of the arcuate portion, a force acts also in a direction of normal to the direction in which the reinforcing tape 46 is peeled. The force in the direction of normal to the direction in which the reinforcing tape 46 is peeled largely acts with a larger thickness of the reinforcing tape 46 and with a larger stepped portion.

Accordingly, there is a tendency that the reinforcing tape 46 is less peeled with a thinner reinforcing tape 46. Therefore, it is preferable that the thin reinforcing tape is wound through several full circumferences rather than that the thick reinforcing tape is wound through one full circumference.

However, even when how thin reinforcing tape is wound, the force in the direction in which the reinforcing tape 46 is peeled cannot be made zero. For that reason, during travelling drive of the intermediary transfer belt M for a long term, there is a possibility that the reinforcing tape 46 is peeled from the belt body 10*e* little by little. Particularly, in the case where a seal member 12 or the like provided at each of end portion of the belt cleaning device 11 is contacted to the reinforcing tape 46 from the outer peripheral portion, a force of constraint acts on the outer peripheral portion, so that the peeling of the reinforcing tape 46 is encouraged.

Further, when the intermediary transfer belt M passes through a position where the radius of curvature is small in a state in which the reinforcing tape 46 is partly peeled, the belt body 10*e* causes buckling deformation. This is because when a force for compressing the intermediary transfer belt M acts on the inner peripheral portion, the belt body 10$e$ is liable to cause the buckling deformation in a state of a single thin belt.

In this case, the radius of curvature of the belt body 10$e$ causing the buckling deformation is small, and therefore a large stress is generated at the buckled portion. For that reason, when the intermediary transfer belt M is driven and moved for a long term, the large stress repetitively acts on the intermediary transfer belt M many times, so that the belt body 10$e$ is broken.

In order to prevent such breaking, there is a need to prevent an occurrence of the peeling of the reinforcing tape 46 from the belt body 10$e$ or an occurrence of the buckling deformation of the belt body 10$e$. The most effective countermeasure to these phenomenon is that the reinforcing tape 46 is applied onto the belt body 10$e$ with respect to the rotational direction (circulating direction) of the belt body 10$e$ with a space so as not to form a seam.

Figure 6:
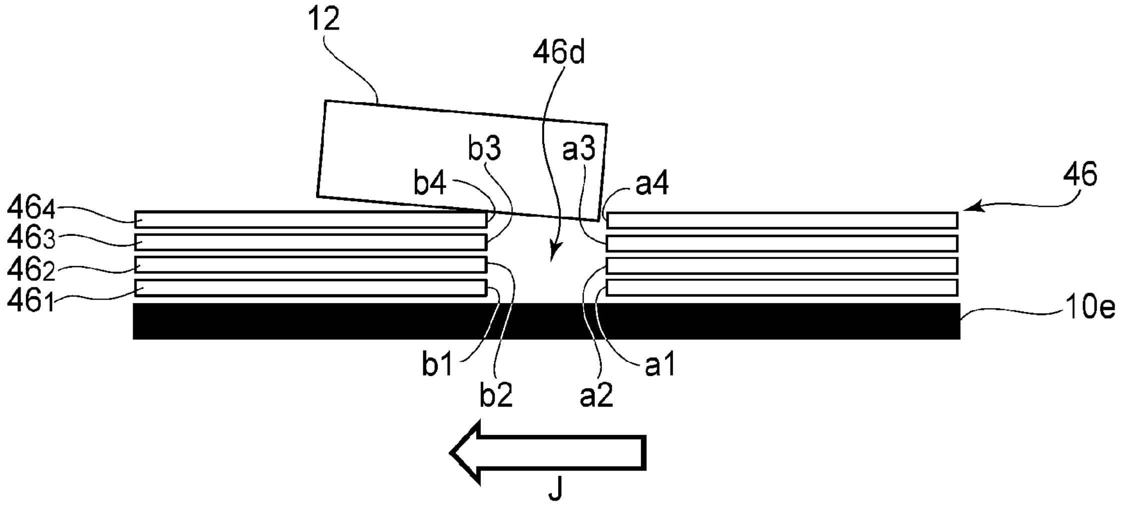
FIG. 6 is an illustration showing a reinforcing tape applying manner in which a spacing is provided by eliminating a seam of the reinforcing tape in Embodiment 1.

FIG. 6 is an illustration showing an applying manner in which the seam of the reinforcing tape 46 is eliminated by providing a spacing portion 46$d$. In this case, there is no seam of the reinforcing tape 46 on the belt body 10$e$, and therefore even when the radius of curvature of the belt body 10$e$ is made small, the force for compressing the belt body 10$e$ is not exerted on the belt body 10$e$. However, in order to prevent abrupt bending of the intermediary transfer belt M, the spacing portion 46$d$ may desirably be 2 mm or more in length with respect to the rotational direction (circulating direction) of the belt body 10$e$.

However, even in the case where the reinforcing tape 46 is applied onto the belt body 10$e$ by providing the spacing portion 46$d$, there is a possibility that a problem that the reinforcing tape 46 is peeled from the belt body 10$e$. That is, when a cut surface of the reinforcing tape 46 at the spacing portion 46$d$ is positioned in a place where the radius of curvature is small, the reinforcing tape 46 is liable to be peeled by a restoring force of the reinforcing tape 46 against the bending. Incidentally, in FIG. 6, the reinforcing tape 46 includes a first layer $46_1$, a second layer $46_2$, a third layer $46_3$ and a fourth layer $46_4$. Further, the reinforcing tape 46 has edges (ends) a1, a2, a3 and a4 of the first layer 46$\underline{a}$, the second layer $46_2$, the third layer $46_3$ and the fourth layer $46_4$, respectively. Further, the reinforcing tape 46 has the other edges (ends) b1, b2, b3 and b4 of the first layer $46_1$, the second layer $46_2$, the third layer $46_3$ and the fourth layer $46_4$, respectively.

Further, as shown in FIG. 6, in the case where the seal member 12 or the like of the belt cleaning device 11 is contacted to the reinforcing tape 46 from the outer peripheral portion, there is a fear that the contacted member is caught by the spacing portion 46$d$ of the reinforcing tape 46 to peel the reinforcing tape 46 from the belt body 10$e$.

In this way, in the method in which the reinforcing tape 46 is only applied onto the belt body 10$e$ by providing the spacing portion 46$d$, although there is an effect on the breaking of the intermediary transfer belt M. There is a fear that the peeling of the reinforcing tape 46 occurs, thus being undesirable.

Embodiment 1

Figure 7:
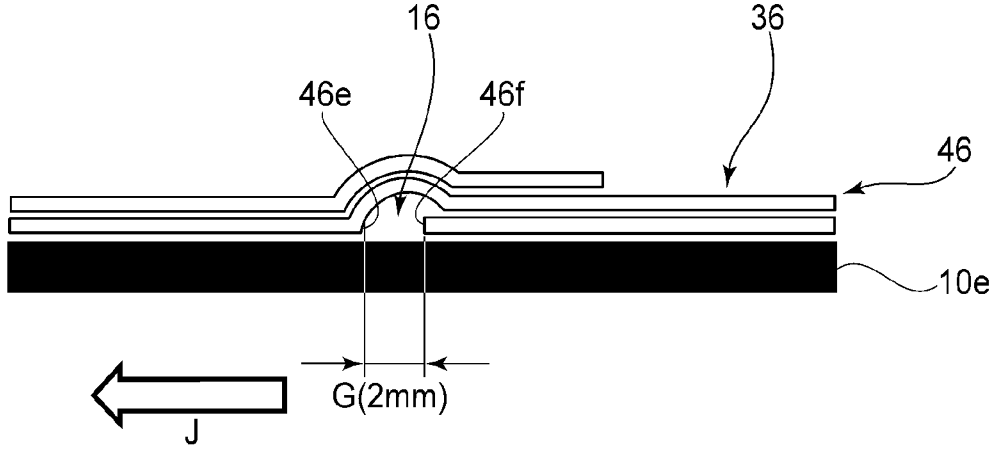
FIG. 7 is an illustration showing a reinforcing tape applying manner in which the reinforcing tape is partly floated in Embodiment 1.

In this embodiment, as shown in FIG. 7, a reinforcing tape 46 (46$a$, 46$b$) constituted as a single long tape elongated continuously as a whole is continuously applied superposedly onto the belt body 10$e$ at each of end portions with respect to a direction perpendicular to a circumferential direction J of the belt body 10$e$. In this step, as a first overlapping portion, a slack portion 16 is formed by applying the reinforcing tape 46 over the belt body 10$e$ in a floating state of the reinforcing tape 46.

Thereafter, the continuous reinforcing tape 46 is wound around the belt body 10$e$ plural times so as to be superposed on the slack portion 16. By constituting the reinforcing tape 46 in such a manner, the rotational direction of the belt body 10$e$ is delimited, so that it is possible to prevent the peeling of the reinforcing tape 46. However, as described above, in order to prevent abrupt bending of the intermediary transfer belt M, a predetermined region G, which is a region of the slack portion 16, between an immediately-before portion 46$e$ and a winding start edge (end portion) 46$f$ for formation of the slack portion 16 may desirably be 2 mm or more with respect to the rotational direction of the intermediary transfer belt M.

In this way, at a reinforcing portion 36 in this embodiment, the reinforcing tape 46 is wound around the belt body 10$e$ through one full circumference or more at each of the end portions with respect to the direction perpendicular to the circumferential direction J. Further, at the reinforcing portion 36, when the reinforcing tape 46 passes through the winding stand edge 46$f$, the slack portion 16 is formed by slackening the reinforcing tape 46 from the portion 46$e$, in front of the winding start edge 46$f$ by the predetermined distance G, to the winding start edge 46$f$.

Further, the predetermined distance G may preferably be set at a value of 2 mm or more in view of the enhancement of the lateral belt shift-limiting effect as described above, but it would be considered that the lateral belt shift-limiting effect is lowered when the predetermined distance G exceeds, e.g., 10 mm. For that reason, the predetermined distance G may more preferably be set in a range from 2 mm to 10 mm which is an upper limit.

As described above, even in the case where the reinforcing tape 46 is applied onto the belt body 10$e$ in the floating state, if a floating amount is insufficient, when the reinforcing tape 46 is positioned at the portion where the radius of curvature is small, there is a fear that the compressing force is exerted on the belt body 10$e$ at the overlapping portion. In the case where the compressing force is exerted on the belt body 10$e$, there is a possibility that the belt body 10$e$ causes the buckling deformation by the compressing force and then is broken by repetition of the buckling deformation.

Therefore, by properly setting the floating amount of the reinforcing tape 46 at the slack portion 16, the belt body 10$e$ and the reinforcing tape 46 are placed in a state in which compression and stretching are not generated between the belt body 10$e$ and the reinforcing tape 46, so that it is possible to prevent the breaking of the intermediary transfer belt M.

The floating amount of the reinforcing tape 46 at that time will be specifically described with reference to FIG. 8. Incidentally, FIG. 8 is an illustration showing the floating amount of the reinforcing tape 46.

Figure 8:
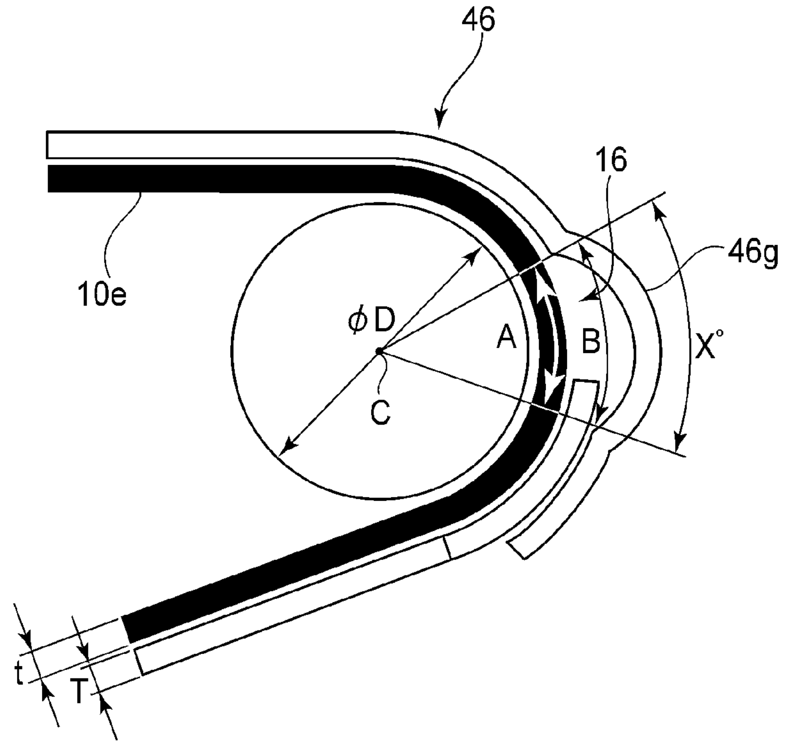
FIG. 8 is an illustration showing a floating amount of the reinforcing tape in Embodiment 1.

That is, as shown in FIG. 8, a diameter of a minimum-diameter roller of the driving roller 10$g$, the follower roller 10$f$ and the tension roller 10$h$ which are used for stretching the intermediary transfer belt M is $\phi$D, the thickness of the belt body 10$e$ is t, and the thickness of the reinforcing tape 46 is T. Further, an angle with respect to a center C of the minimum-diameter roller at an expansion portion 46$g$ of the slack portion (floating region) 16 of the reinforcing tape 46 is X (degrees).

In FIG. 8, with respect to the angle X (degrees), when a length of the belt body 10$e$ is A and a length of the reinforcing tape 46 is B, if a difference (B−A) between the lengths A and B exceeds 0, the belt body 10$e$ and the reinforcing tape 46 are placed in a relationship such that the compression and stretching are not generated. That is, this relationship is represented by the following formulas (1), (b) and (3).

$$A=\pi(D+2t)\times X/360 \quad (1)$$

$$B=\pi(D+2t+2T+2T)\times X/360 \quad (2)$$

$$B-A=\pi(4T)\times X/360>0 \quad (3)$$

In accordance with such a length relationship, the reinforcing tape 46 is applied onto the belt body 10*e*, so that the slack portion 16 is provided with a proper floating amount and thus the belt breaking can be prevented.

Here, e.g., in a constitution in which the reinforcing tape 46 is applied onto the belt body 10*e* in the floating state, in the case where the seal member 12 or the like of the belt cleaning device 11 is contacted to the applied portion of the reinforcing tape 46 from the outer peripheral portion, a stress is applied to the slack portion 16 of the reinforcing tape 46 by the contacted member.

Figure 9:
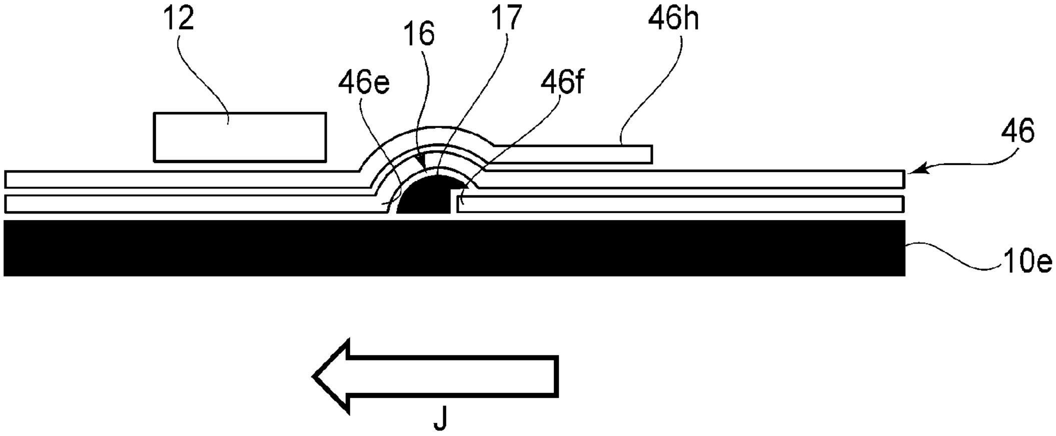
FIG. 9 is an illustration showing a reinforcing tape applying manner using an elastic member in Embodiment 1.
Figure 10:
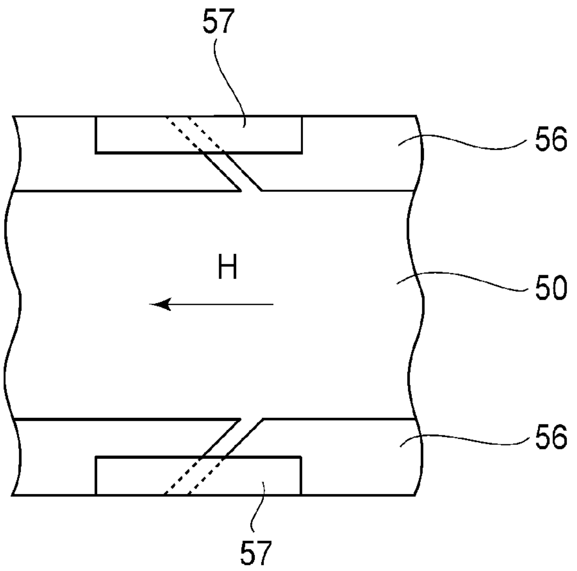
FIG. 10 is an illustration showing a conventional manner of applying a reinforcing tape and a seam reinforcing film.

In such a state, when the intermediary transfer belt M is continuously used, there is a possibility that the reinforcing tape itself is torn by repetitive stress. In order to prevent this phenomenon, as shown in FIG. 9, an elastic member 17 may preferably be inserted into an inside of the slack portion 16. That is, the elastic member 17 is disposed between the winding start edge (end portion) 46*f* and the portion 46*e* in front of the winding start edge 46*f* by the predetermined distance G so that the slack portion 16 is constituted by the elastic member 17.

By disposing the elastic member 17 in such a manner, a degree of freedom of the reinforcing tape 46 at the slack portion 16 is suppressed, so that the stress exerted from the contacted member can be considerably reduced. The elastic member 16 disposed at the slack portion 16 is constituted by an elastic material, and therefore the belt body 10*e* and the reinforcing tape 46 are prevented from causing the compression and stretching therebetween.

In this embodiment, an elastic adhesive can be used as the elastic member 17, but is not limited thereto. For example, it is also possible to use a soft material, having an elastic characteristic, such as urethane foam or a rubber-based foam member.

Further, as in this embodiment, in the case where the seal member 12 as a slidable member slidable on the belt body 10*e* at the end portions with respect to the direction perpendicular to the circumferential direction J of the belt body 10*e*, the other end portion 46*h* of the reinforcing tape 46 corresponding to final one full circumference is applied toward an upstream side of the intermediary transfer belt M with respect to the circumferential direction J. According to this constitution, even when the seal member 12 repetitively slides on the belt body 10*e* at the widthwise end portions, the other end portion 46*h* of the reinforcing tape 46 is prevented from being caught by the seal member 12. Therefore, the seal member 12 smoothly slides on the other end portion 46*h*, so that an occurrence of an inconvenience such that the peeling of the reinforcing tape 46 is started from the other end portion 46*h* can be obviated with reliability.

The reinforcing portion 36 as described above includes, when the reinforcing tape 46 is wound around the outer peripheral surface of the belt body 10*e* at each of the end portions and passes through the winding start edge (edge) 46*f*, the slack portion 16 where the reinforcing tape 46 is slackened from the portion, in front of the portion 46*f* by the predetermined distance, to a portion where the reinforcing tape 46 overlaps the portion 46*f*.

As a result, the difference in length between the outer peripheral portion and the inner peripheral portion generated when the reinforcing tape 46 passes through the roller, of the above-described rollers 10*g*, 10*f* and 10*h*, having the smallest radius of curvature can be absorbed by the outer peripheral portion of the reinforcing tape 46 applied so as to have a long passage length by providing the slack portion 16. In this way, a circumferential length of the reinforcing tape 46 at a portion corresponding to the stepped portion (FIG. 4) is prolonged, so that at the seam portion of the reinforcing tape 46, repetition of the buckling deformation of the belt body 10*e* can be prevented and thus the peeling of the reinforcing tape 46 can be prevented, with the result that it is possible to realize life extension of the intermediary transfer belt M.

Embodiment 2

Figure 11:
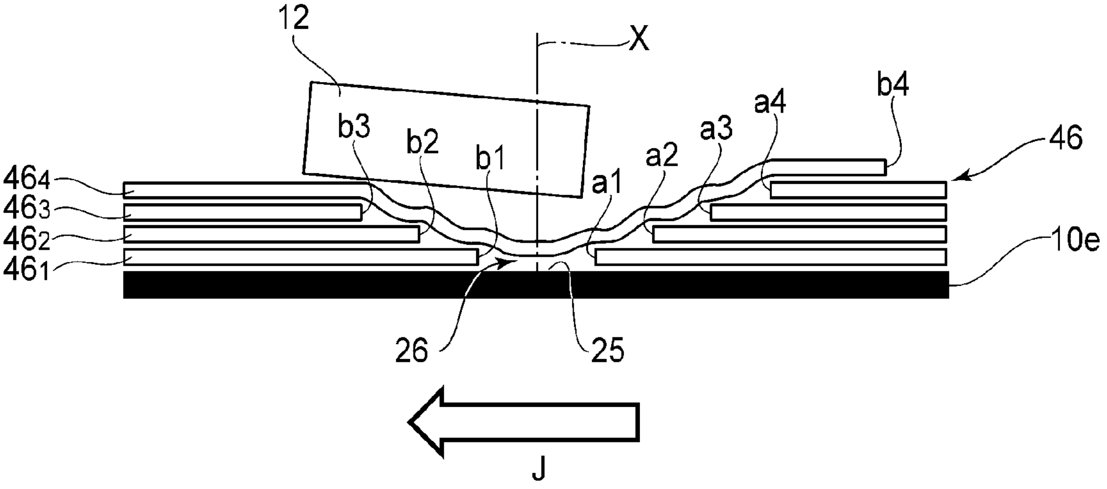
FIG. 11 is an illustration showing a reinforcing tape applying manner in which a seam is created only through final one full circumference in Embodiment 2.

In this embodiment, as shown in FIG. 11, in the case where the reinforcing tape 46 is wound around the belt body 10*e* through a plurality of full circumferences (n circumferences), a recessed portion 26 is provided without creating a seam except for final one full circumference (n-th circumference) and is positioned at the same portion where the seam is not created. Further, only through the final one full circumference (n-th circumference), a second tape $46_4$ of the reinforcing tape 46 is applied so as to create the seam while extending over the recessed portion 26, so that the peeling of the reinforcing tape 46 is prevented.

That is, at the reinforcing portion 36 (FIG. 2) in this embodiment, as shown in FIG. 11, the reinforcing tape 46 is divided every one full circumference of the outer peripheral surface at each of the end portions with respect to the widthwise direction perpendicular to the circumferential direction J. As a result, the reinforcing tape 46 is constituted by a plurality of first tapes $46_1$, $46_2$ and $46_3$ each shorter than one full circumference of the belt body 10*e* and the second tape $46_4$ longer than the one full circumference. Further, the first tapes $46_1$, $46_2$ and $46_3$ are applied in this order so that winding start positions of end portions a1, a2 and a3 for winding around the outer peripheral surface and winding end positions of the other end portions b1, b2 and b3 are different from each other with respect to the circumferential direction J. Further, the recessed portion 26 is formed by the end portions a1, a2 and a3 and the other end portions b1, b2 and b3, and then the second tape $46_4$ is wound around the first tapes $46_1$, $46_2$ and $46_3$ so that the other edge (edge) b4 of the second tape $46_4$ extends along the recessed portion 26. Thus, the second tape $46_4$ is applied and stopped at a position upstream of a winding start edge (end portion) a4 for winding over the outer peripheral surface with respect to the circumferential direction J.

Here, when the number of layers formed by winding the first and second tapes is n, the first tapes from a first layer to an (n−1)th layer have a spacing so that end portions of the first tapes do not overlap the other end portions of the first tapes at a central point X between the edge a1 and the other edge b1 on an outer peripheral surface 25 of the belt body 10*e*. Further, the second tape of an n-th layer (the second tape $46_4$ of a fourth layer in this embodiment) is applied so that the other edge b4 overlaps the edge a4.

Further, a distance from the point X to a winding start position as the edge of the first tape of the first layer is y1a, a distance from the point X to a winding end position as the other edge of the first tape of the first layer is y1b, a distance from the point X to a winding start position as the edge of the first tape of the second layer is y2a, a distance from the point X to a winding end position as the other edge of the first tape of the second layer is y2b, a distance from the point X to a winding start position as the edge of the first tape of the (n−1)th layer is y(n−1)a, and a distance from the point X to a winding end position as the other edge of the first tape of the (n−1)th layer is y(n−1)b.

Further, when a distance from the point X to a winding start position as the edge of the second tape of the n-th layer is yna, the distances satisfy both of formulas (1) and (2) below so that the winding start positions and the winding end positions of the first tapes of adjacent layers are not in the same position:

$$y1a<y2a<\ldots<y(n-1)a<yna, \text{ or}$$

$$y1a>y2a>\ldots>y(n-1)a>yna \quad (1)$$

$$y1b<y2b<\ldots<y(n-1)b<ynb, \text{ or}$$

$$y1b>y2b>\ldots>y(n-1)b>ynb \quad (2).$$

In this embodiment, the seal member 12 as a slidable member slidable on the reinforcing tape 46 at the end portions with respect to the direction perpendicular to the circumferential direction J of the belt body 10*e* is provided (FIG. 7). In this structure, the other end portion b4 of the second tape $\mathbf{46_4}$ as the reinforcing tape 46 corresponding to final one full circumference (final layer) is applied toward an upstream side of the intermediary transfer belt M with respect to the circumferential direction J. According to this constitution, even when the seal member 12 repetitively slides on the belt body 10*e* at the widthwise end portions, the other end portion b4 of the reinforcing tape 46 is prevented from being caught by the seal member 12. Therefore, the seal member 12 smoothly slides on the other end portion b4, so that an occurrence of an inconvenience such that the peeling of the reinforcing tape 46 is started from the other end portion b4 can be obviated with reliability.

Figure 12:
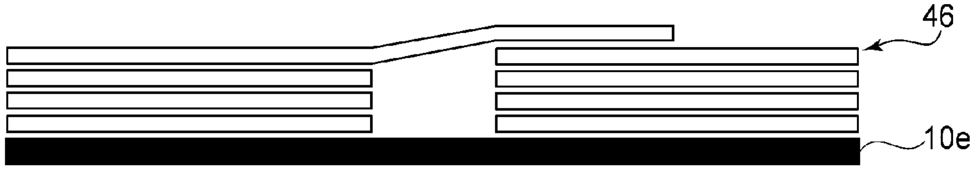
FIG. 12 is an illustration showing a reinforcing tape applying manner in which the reinforcing tape is superposed only through final one full circumference in Embodiment 2.

FIG. 12 is an illustration of the case where the reinforcing tape 46 is applied superposedly as used only through final one full circumference (final layer), different from this embodiment shown in FIG. 11. As shown in FIG. 12, in the case of a constitution in which the reinforcing tape 46 has no excessive length with respect to the final one full circumference, further some problems occur.

That is, in FIG. 12, when a portion where a spacing of the reinforcing tape 46 is provided is positioned in a place where the radius of curvature is small, the reinforcing tape 46 of n-th circumference (n-th layer) having no excessive length is subjected to a force in the stretching direction. For that reason, the belt body 10*e* of the intermediary transfer belt M is subjected to a compressing force.

In this case, by the compressing force, the belt body 10*e* also causes the buckling deformation. Then, when the buckling deformation is repeated, the belt body 10*e* is broken. Further, the reinforcing tape 46 of n-th circumference (n-th layer) having no excessive length receives the stretching force, but there arises such a problem that the reinforcing tape 46 is broken unless strength of the reinforcing tape 46 is sufficient.

Thus, in the constitution in which the reinforcing tape 46 is applied superposedly only through the final one full circumference, the problem cannot be solved. Therefore, in this embodiment, as also shown in FIG. 11, the reinforcing tape 46 (second tape $\mathbf{46_4}$ in FIG. 11) is applied in a relatively long length with excessive length through the final one full circumference. As a result, the belt body 10*e* and the reinforcing tape 46 are prevented from generating the compressing and stretching forces therebetween.

In this embodiment described above with reference to FIG. 11, the reinforcing tape 46 is applied so that the spacing at the recessed portion 26 is gradually increased toward the outer layer, i.e., in the order of the first circumference (first layer), the second circumference and the third circumference. In this case, a shape of the recessed portion 26 is a reversed pyramid shape, so that a moderate stepped portion is formed by the reinforcing tape 46 and therefore in the case where the reinforcing tape 46 is wound through the final one full circumference, the reinforcing tape 46 is applied along an inclined surface of the stepped portion of the recessed portion 26. Correspondingly to the oblique application of the reinforcing tape 46 (second tape $\mathbf{46_4}$ in FIG. 11) along the inclined surface of the recessed portion 26, the reinforcing tape 46 (second tape $\mathbf{46_4}$) is applied in a relatively long length with the excessive length.

In this case, even when the portion where the reinforcing tape 46 is provided with the recessed portion 26 is positioned in the place where the radius of curvature is small, the reinforcing tape 46 of the final one full circumference (the second tape $\mathbf{46_4}$ in FIG. 11) has the excessive length and thus is longer than other first tapes. For this reason, the belt body 10*e* and the reinforcing tape 46 do not generate the compressing and stretching forces therebetween. Therefore, it is possible to reliably prevent breaking of the belt body 10*e* and the reinforcing tape 46 while preventing the peeling of the reinforcing tape 46.

Further, the reinforcing tape 46 of the final one full circumference is applied onto the recessed portion 26 having the reversed pyramid-shaped stepped portion, so that the resultant surface is smoothened. For that reason, the contact of the contacted member, from the outer peripheral portion, such as the seal member 12 or the like of the belt cleaning device 11 end portion becomes smooth, and therefore it is possible to prevent abrasion (wearing) tearing of the reinforcing tape 46 due to friction between the reinforcing tape 46 and the seal member 12.

Figure 14:
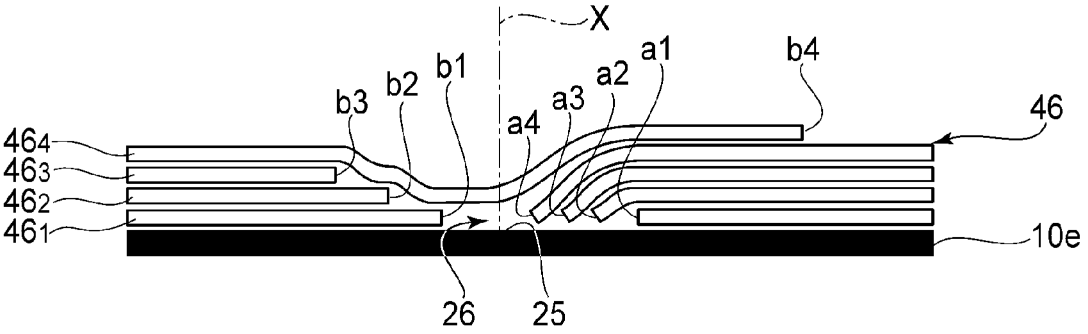
Figure 15:
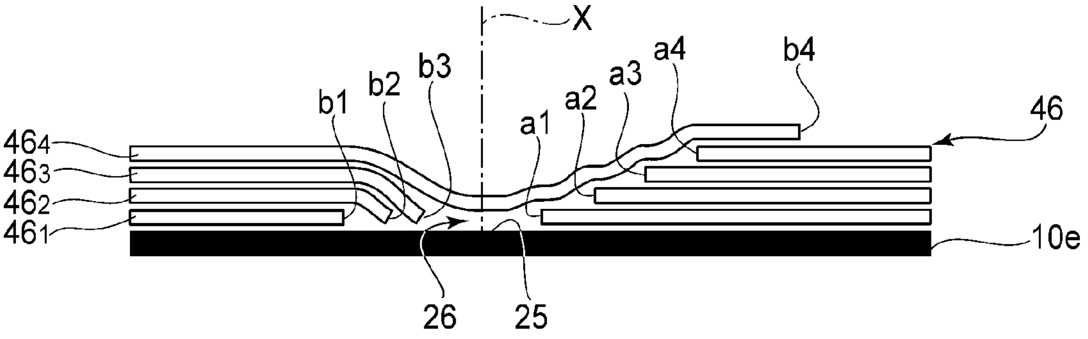

Next, a modified embodiment of this embodiment will be described with reference to FIGS. 13, 14 and 15. Incidentally, FIGS. 13, 14 and 15 are illustrations each showing the modified embodiment.

Figure 13:
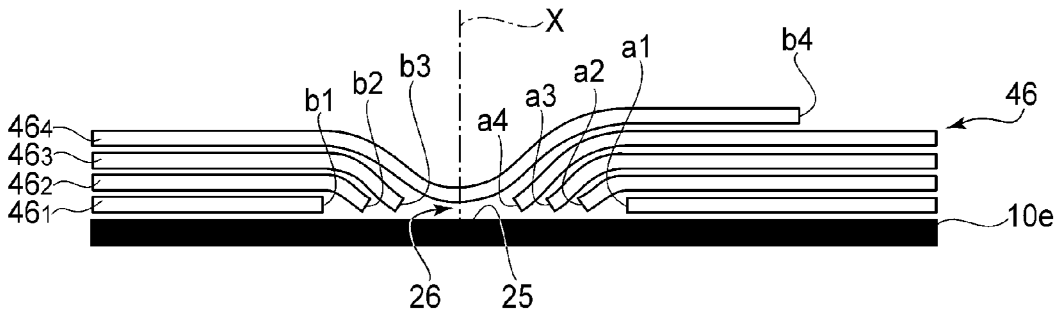
FIGS. 13 to 15 are illustrations each showing another reinforcing tape applying manner in Embodiment 2.

In FIG. 13, the first tapes $\mathbf{46_1}$, $\mathbf{46_2}$ and $\mathbf{4}n\mathbf{6_3}$ are applied so that the spacing of the recessed portion 26 is gradually decreased toward the outer layer, i.e., in the order of the first circumference (first layer), the second circumference and the third circumference. In this case, the shape of the recessed portion 26 is pyramid shape reversed to the shape shown in FIG. 11, but the end portions a1, a2 and a3 and the other end portions b1, b2 and b3 of the first tapes $\mathbf{46_1}$, $\mathbf{46_2}$ and $\mathbf{46_3}$ are in a state in which the portions sag toward an inside of the recessed portion 26. As a result, a spacing between the belt body 10*e* and the first tapes $\mathbf{46_1}$, $\mathbf{46_2}$ and $\mathbf{46_3}$ under the second tape $\mathbf{46_4}$ is eliminated.

Accordingly, the recessed portion 26 has a moderate slope shape as shown in FIG. 13, and therefore the reinforcing tape $\mathbf{46_4}$ of the final one full circumference (final layer) is applied along the slope. Therefore, the second tape $\mathbf{46_4}$ is applied in a relatively long length with an excessive length.

Also in this case, the belt body 10*e* and the reinforcing tape 46 do not generate the compressing and stretching (tensile) forces therebetween. Therefore, it is possible to prevent breaking of the belt body 10*e* and the reinforcing tape 46 while preventing the peeling of the reinforcing tape 46.

FIGS. 14 and 15 show the modified embodiments in which the applying manners of FIGS. 11 and 13 are applied.

That is, in the modified embodiments shown in FIGS. 14 and 15, the applying manners of FIGS. 11 and 13 are applied in a winding end side and a winding start side, and in the winding start side and the winding end side, respectively.

Also in these constitutions, the reinforcing tape 46 (second tape $46_4$) of the final one full circumference is applied along the stepped portion or the slope-shaped portion of the recessed portion 26, and the reinforcing tape 46 is applied in a relatively long length with an excessive length.

Accordingly, also in these modified embodiment, the belt body 10*e* and the reinforcing tape 46 do not generate the compressing and stretching (tensile) forces therebetween, so that it is possible to prevent breaking of the belt body 10*e* and the reinforcing tape 46 while preventing the peeling of the reinforcing tape 46.

Incidentally, in Embodiment 2 and the modified embodiments described above, it is possible to employ a constitution in which thicknesses of the first tapes and the second tape which range from the first one full circumference (first layer) to the n-th circumference (n-th layer) are made different from each other. Alternatively, the thickness of the second tape of the n-th layer can be set at a value thinner than the thicknesses of the first tapes from the first layer to the (n−1)th layer.

Further, a dimension of the second tape of the n-th layer with respect to the widthwise direction perpendicular to the circumferential direction J can be set at a value smaller than dimensions of the first tapes from the first layer to the (n−1)th layer. Or, the tensile strength of the second tape of the n-th layer can be set at a value weaker than the tensile strength of the first tapes from the first layer to the (n−1)th layer.

Here, an experiment in this embodiment (including the above-described modified embodiments) and a result thereof will be described.

That is, the belt body 10*e* is prepared in a thickness of, e.g., 48 μm by using PEEK (polyether ether ketone). The belt body 10*e* is 346 mm in width with respect to a direction perpendicular to a conveyance direction (rotational direction) of the belt body 10*e* and 792 mm in length (circumferential length) with respect to the circumferential direction of the belt body 103. Further, the reinforcing tape 46 is wound around the belt body 10*e* through four full circumferences at each of the end portions of the belt body 10*e* so as to have a width of 5 mm with respect to the direction perpendicular to the conveyance direction (circumferential direction).

That is, the dimension (M in FIG. 3) from an inner edge (surface) of the reinforcing tape 46*a* (FIG. 3) to an inner edge (surface) of the other reinforcing tape 46*b* with respect to the belt widthwise direction is 336 mm. Further, the dimension (N in FIG. 3) from an outer edge (surface) of the reinforcing tape 46*a* to an outer edge (surface) of the other reinforcing tape 46*b* with respect to the belt widthwise direction is 346 mm.

The reinforcing tape 46 is formed of polyester in a thickness of 25 μm. As an adhesive for applying the reinforcing tape 46 onto the belt body 10*e*, an acrylic adhesive is used.

Further, the driving roller 10*g* is 14.8 mm in diameter and is 338 mm in width. For that reason, in the case where the intermediary transfer belt M is provided at a central portion of the driving roller 10*g*, the reinforcing tape 46 rides over the driving roller 10*g* by 1 mm at each of the end portions.

Further, the tension roller 10*h* is 18 mm in diameter and stretches the intermediary transfer belt M by a force of 3 kgf in total pressure. Further, the follower roller 10*f* of 12 mm in diameter is mounted as a roller preceding (upstream of) the driving roller 10*g*, so that the intermediary transfer belt M is stretched by the three rollers. In such a condition, the belt body 10*e* is driven until the belt body 10*e* is torn (broken).

Figure 16:
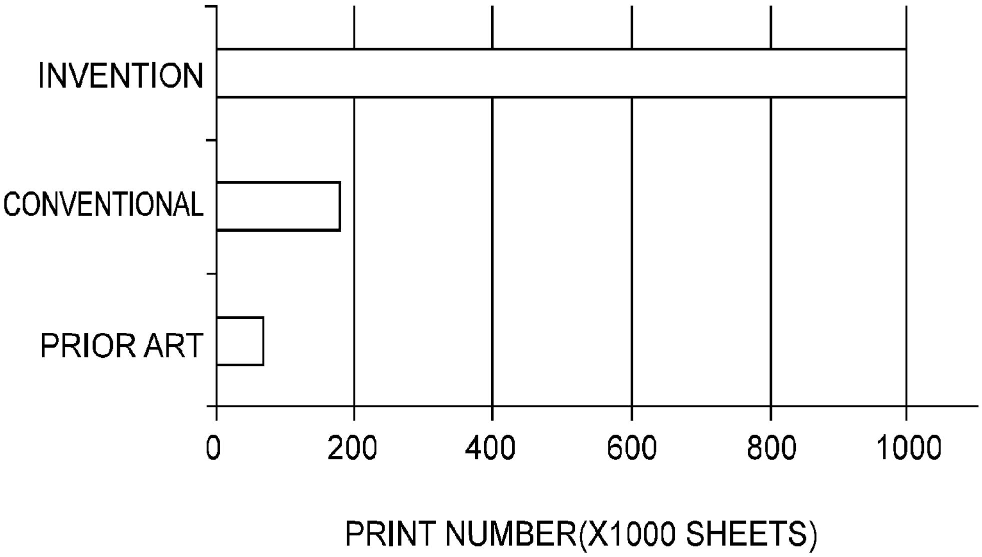
FIG. 16 is a graph showing an experimental result in which a degree of resistance to breaking of the reinforcing tape in Embodiment 2 is compared with prior art and a conventional constitution.

FIG. 16 is a graph showing an experimental result of a comparison of a degree of less tearing of the belt between this embodiment, a conventional example, and the prior art. Specifically, in FIG. 16, the case where the reinforcing tape 46 is applied by the method in which the spacing is not provided as in the prior art ("PRIOR ART"), the case where the reinforcing tape 46 is applied by the method described in JP-A 2002-68513 ("CONVENTIONAL") and the case where the reinforcing tape 46 is applied by the method of FIG. 11 in this embodiment ("INVENTION") are compared.

A bar graph of FIG. 16 shows that the belt body 103 is torn when how many turns (print number) the belt body 10*e* is rotated. A longer bar graph data represents that the belt body 10*e* is less torn.

In the case of the prior art in which no spacing is provided, the belt body 10*e* is torn by 70 (×1000) turns (sheets), and in the case of the method of JP-A 2002-68513, the belt body 10*e* is torn by 180 (×1000) turns.

On the other hand, in this embodiment, the belt body 10*e* was not torn even after the belt body 10*e* was rotated through 1000 (×1000) turns.

As apparent from the experimental result described above, according to this embodiment, it was found that lifetime extension of the intermediary transfer belt M was able to be realized.

According to this embodiment and the modified embodiments thereof, at the seam portion of the reinforcing tape 46, repetition of the buckling deformation of the belt body 10*e* can be prevented and at the same time, the peeling of the reinforcing tape 46 can be prevented, so that it is possible to realize life extension of the intermediary transfer belt M.

That is, in this embodiment and the modified embodiments thereof, in the case where the reinforcing tape 46 is wound around the belt body 10*e* through a plurality of full circumferences (n circumferences), the seam of the reinforcing tape 46 is not formed except for the final one full circumference (n-th circumference), but the spacings between the end portions and the other end portions are positioned in the same position to create the recessed portion 26. At that time, the tape end portions from the first circumference to the (n−1)th circumference are shifted so as to be monotonously increased or decreased to form the pyramid shape or the reversed-pyramid shape of the recessed portion 26. Then, only through the final one full circumference (n-th circumference), the second tape is applied so that the seam is created while extending over the recessed portion 26, so that the peeling of the reinforcing tape 46 is prevented.

As described above, the spacing is provided while eliminating the seam of the reinforcing tape 46 from the first circumference to the (n−1)th circumference, and therefore when the belt body 10*e* passes through the place, where the radius of curvature is small, such as the stretching roller, it is possible to eliminate a factor causing a phenomenon that the difference in length between the outer peripheral portion and the inner peripheral portion is generated to buckle the belt body 10*e*.

Further, only through the final one full circumference, the reinforcing tape 46 is provided with the seam. For this reason, by an effect of applying the reinforcing tape while shifting the end portions and the other end portions from the first circumference to the (n−1)th circumference, the reinforcing tape 46 can be applied so as to follow the shape of the stepped portion, so that a passage length of the reinforcing tape 46 can be made longer than a distance in a straight line to provide an excessive length. Further, the difference in length between the outer peripheral portion and the inner peripheral portion generated during the passing of the belt body 10*e* through the place where the radius of curvature is small can be absorbed by the second tape applied in the long passage length, so that the belt body 10*e* can be prevented from causing the buckling. As a result, the tearing of the belt caused due to the difference in length between the outer peripheral portion and the inner peripheral portion of the belt body 10*e* and the reinforcing tape 46 can be prevented with reliability.

Further, by applying the reinforcing tape 46 onto the recessed portion 26 after forming the stepped portion, the surface of the second tape can be made smooth. As a result, the contact of the contacted member (such as the seal member 12) from the outer peripheral portion can be made smooth, so that it is possible to prevent abrasion (wearing) breaking (tearing) of the reinforcing tape 46 due to friction between the reinforcing tape 46 and the contacted member.

Embodiment 3

Figure 17:
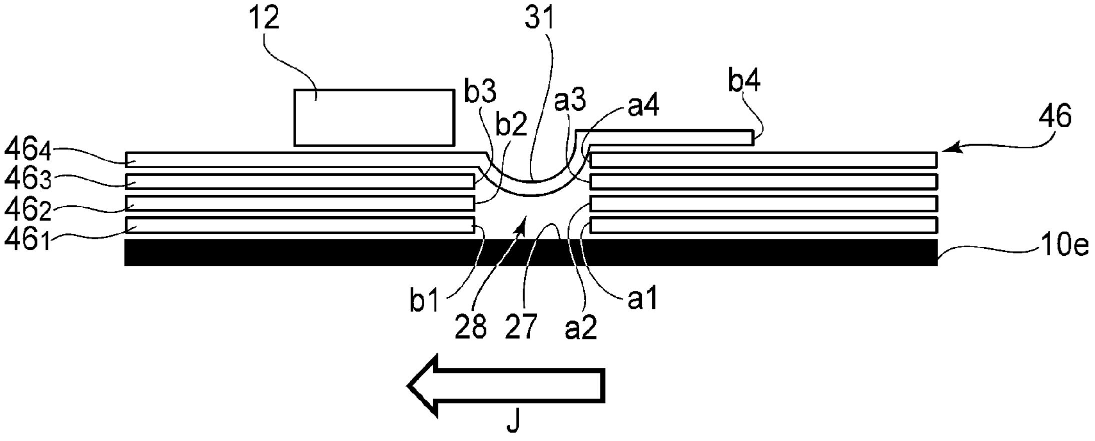
FIG. 17 is an illustration showing a reinforcing tape applying manner in which a reinforcing tape is superposed only through final one full circumference in Embodiment 3.

In this embodiment, as shown in FIG. 17, the reinforcing tape 46 is constituted by one or more first tape and a second tape, and is applied onto the outer peripheral surface of the belt body 10*e* at each of widthwise end portions so that longitudinal end portions and the other longitudinal end portions do not overlap each other. As a result, a recessed portion 28 is formed on an outer peripheral surface 27 of the belt body 10*e*, and the reinforcing tape 46 is applied through a final one full circumference so as to extend over the recessed portion 28.

That is, in this embodiment, the reinforcing portion 36 (FIG. 2) is divided every winding through one full circumference on the outer peripheral surface at each of the end portions, and is constituted by the first tapes $46_1$, $46_2$ and $46_3$ each shorter than the full circumference of the belt body 10*e* and the second tape $46_4$ longer than the full circumference of the belt body 10*e*. Further, the first tapes $46_1$, $46_2$ and $46_3$ are applied onto the outer peripheral surface 27 so as to form the recessed portion 28 defined by the end portions a1, a2 and a3 and the other end portions b1, b2 and b3, and then the second tape $46_4$ is applied in a slack state while extending over the recessed portion 28 so that the other end portion b4 overlaps the (winding start) end portion a4 and a downstream portion of the end portion a4 with respect to the winding direction.

By employing such a constitution, it is possible to delimit the rotational direction of the belt body 10*e* while preventing the peeling of the belt body 10*e*.

Here, when the reinforcing tape 46 of the final full circumference is applied, if the reinforcing tape 46 is applied in a tension state relative to the belt body 10*e*, similarly as in the conventional case, the compressing force is exerted on the seam portion of the belt body 10*e* when the belt body 10*e* is positioned in the place where the radius of curvature is small. At this time, the belt body 10*e* causes the buckling deformation by the compressing force. Then, when the buckling deformation is repeated, there arises a fear that the belt body 10*e* is broken.

Therefore, when the reinforcing tape 46 of the final full circumference (final one layer) is applied while extending over the recessed portion 28, as shown in FIG. 17, the winding end edge (the other end portion) b4 of the second tape $46_4$ is applied onto the winding start edge (end portion) a4 of the second tape $46_4$ while forming a slackened portion 31 relative to the belt body 10*e*. As a result, the belt body 10*e* and the reinforcing tape 46 are placed in a state in which compression and stretching are not generated between the belt body 10*e* and the reinforcing tape 46, so that it is possible to prevent the breaking of the belt body 10*e*.

The slack amount of the reinforcing tape 46 in this case will be described with reference to FIG. 18. Incidentally, FIG. 18 is an illustration showing the slack amount of the reinforcing tape 46.

Figure 18:
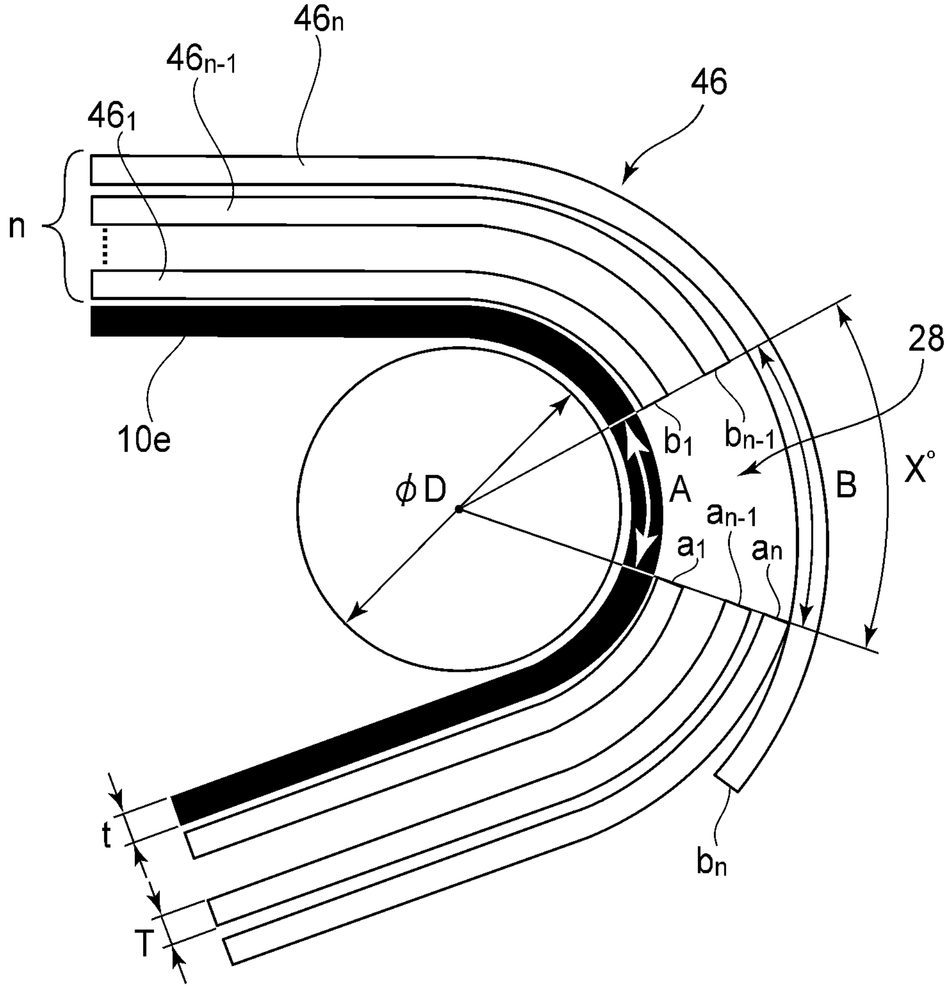
FIG. 18 is an illustration showing a slack amount of the reinforcing tape in Embodiment 3.

That is, as shown in FIG. 18, a diameter of a minimum-diameter roller of the driving roller 10*g*, the follower roller 10*f* and the tension roller 10*h* is ϕD, the thickness of the belt body 10*e* is t, and the thickness of the reinforcing tape 46 is T. Further, an angle with respect to a center C of the minimum-diameter roller at the recessed portion 28 of the reinforcing tape 46 is X (degrees).

At this time, when the slack amount at the slackened portion 31 is not less than a difference (B−A) between a length A of the belt body 10*e* within a range of the angle X (degrees) and a length B of the reinforcing tape 46 of the final one layer within the range of the angle X (degrees), the belt body 10*e* and the reinforcing tape 46 are placed in a relationship such that the compression and stretching are not generated. That is, this relationship is represented by the following formulas (I), (b) and (3).

$$A=\pi(D+t)\times X/360 \quad (1)$$

$$B=\pi(D+2t+2Tn+T)\times X/360 \quad (2)$$

$$B-A=\pi\{(2n+1)T+t\}\times X/360>0 \quad (3)$$

Incidentally, in FIG. 18, first tapes $46_1$ to $46_{(n-1)}$ and a second tape $46_n$ are applied onto the belt body 10*e* in layers. Further, the first tapes $46_1$ and $46_{(n-1)}$ and the second tape $46_n$ have winding start edges (end portions) a1, a(n−1) and an, respectively, and have winding end edges (the other edges) b1, b(n−1) and bn, respectively.

In this embodiment, the seal member 12 as a slidable member slidable on the belt body 10*e* at the end portions with respect to the direction perpendicular to the circumferential direction J of the belt body 10*e* is provided (FIG. 17). In this structure, the other end portion b4 of the second tape $46_4$ of the reinforcing tape 46 corresponding to final one full circumference (final one layer) is applied toward an upstream side of the intermediary transfer belt M with respect to the circumferential direction J.

According to this constitution, even when the seal member 12 repetitively slides on the belt body 10*e* at the widthwise end portions, the other end portion b4 of the reinforcing tape 46 is prevented from being caught by the seal member 12. Therefore, the seal member 12 smoothly slides on the other end portion b4, so that an occurrence of an inconvenience such that the peeling of the reinforcing tape 46 is started from the other end portion b4 can be obviated with reliability.

Figure 19:
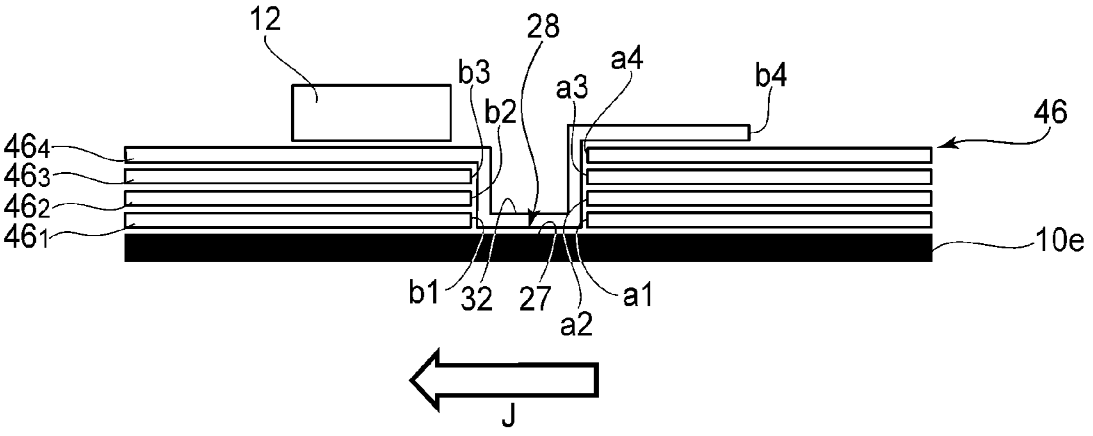
FIG. 19 is an illustration showing another reinforcing tape applying manner in which the reinforcing tape is superposed only through final one full circumference in Embodiment 3.
Figure 20:
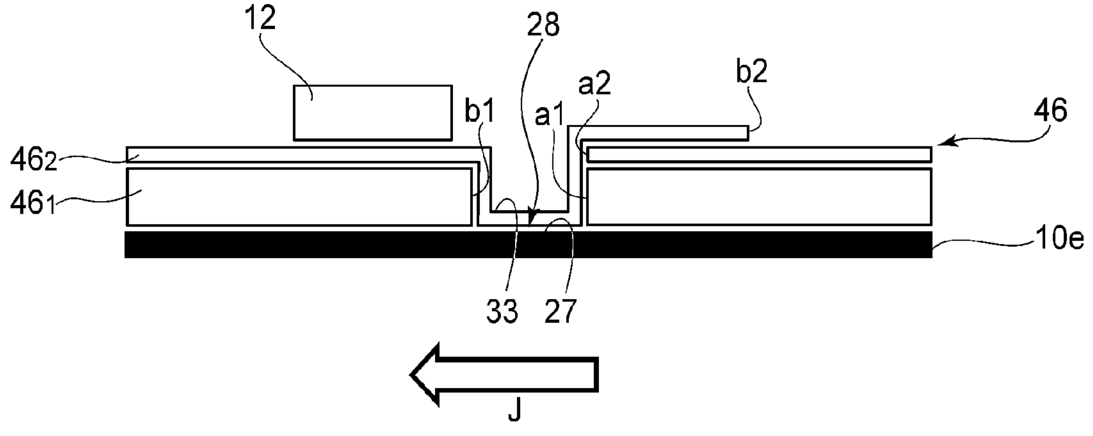
FIG. 20 is an illustration showing another reinforcing tape applying manner in which the reinforcing tape is superposed only through final one full circumference in Embodiment 3.

Here, as shown in FIGS. 19 and 20 each showing a modified embodiment, it is also possible to employ a constitution in which the second tape $46_4$ is applied so that each of seam portions 32 and 33 as a slack portion extending along the recessed portion 28 extends along and follows the shape of the recessed portion 28.

That is, in the modified embodiment shown in FIG. 19, different from the case of FIG. 17 in which the same portion is slackened as the slackened portion 31, the second tape $46_4$ is applied so that the seam portion 32 extends along the shape of the recessed portion 28, so that also by this constitution, a similar effect can be obtained.

Further, in the modified embodiment shown in FIG. 20, different from the case of FIG. 17 in which the same portion is slackened as the slackened portion 31, the second tape $46_2$ is applied so that the seam portion 33 extends along the shape of the recessed portion 28, so that also by this constitution, a similar effect can be obtained.

In the modified embodiment of FIG. 19, the second tape $46_4$ is constituted so as to have the same thickness as the first tapes $46_1$ to $46_3$. Further, in the modified embodiment of FIG. 20, the second tape ($46_2$ in this modified embodiment) of the final one full circumference (final one layer) is constituted as a tape having a thickness thinner than the thickness of the first tape 46$_1$. In this way, the second tape 46$_2$ of the final one layer is made thin or is lowered in rigidity to further decrease a force of constraint at the seam portion 33, so that the degree of the buckling of the intermediary transfer belt M can be further alleviated, and therefore it is possible to more effectively suppress the breaking of the belt.

According to this embodiment and the modified embodiments thereof, at the seam portion of the reinforcing tape 46, repetition of the buckling deformation of the belt body 10*e* can be prevented and at the same time, the peeling of the reinforcing tape 46 can be prevented, so that it is possible to realize life extension of the intermediary transfer belt M.

That is, in this embodiment and the modified embodiments thereof, one or more first tapes are applied onto the outer peripheral surface of the belt body 10*e* at each of the end portions with respect to the widthwise direction of the belt body 10*e* so that the end portions and the other end portions do not overlap each other. Further, the second tape of the final one full circumference is applied so as to extend along the recessed portion 28. As a result, even in the case where there is a member, such as the seal member 12, contacted to the recording material 46 from the outer peripheral portion, the peeling of the reinforcing tape 46 can be prevented.

Further, the second tape of the final one full circumference is applied while forming the slackened portion 31 by being slackened in the recessed portion 28 or is applied so as to extend along the shape of the recessed portion 28, so that the circumferential length of the second tape can be prolonged to provide the excessive length. As a result, the difference in length between the outer peripheral portion and the inner peripheral portion generated during the passing of the belt body 10*e* through the place, such as the stretching roller, where the radius of curvature is small can be absorbed by the second tape applied in the long passage length, so that the belt body 10*e* can be prevented from causing the buckling. As a result, the tearing of the belt caused due to the difference in length between the outer peripheral portion and the inner peripheral portion of the belt body 10*e* and the reinforcing tape 46 can be prevented.

According to the present invention, it is possible to not only prevent repetition of the buckling of the belt body at the reinforcing tape seam portion but also prevent the peeling of the reinforcing tape to realize lifetime extension of the endless belt.

While the invention has been described with reference to the structures disclosed herein, it is not confined to the details set forth and this application is intended to cover such modifications or changes as may come within the purpose of the improvements or the scope of the following claims.

This application claims priority from Japanese Patent Applications Nos. 268330/2012 filed Dec. 7, 2012, 268331/2012 filed Dec. 7, 2012 and 268332/2012 filed Dec. 7, 2012, which are hereby incorporated by reference.

What is claimed is:

1. An endless belt comprising:

an endless belt body;

a plurality of first tapes each wound around and applied onto said belt body on an outer peripheral surface of each of end portions of said belt body with respect to a widthwise direction crossing a circumferential direction of said belt body, wherein each of said first tapes has a length, from a first end to a second end with respect to the circumferential direction, shorter than a length of a full circumference of said endless belt, and said first tapes are superposedly applied onto said belt body so that positions of first edges of said first tapes and positions of second edges of said first tapes are different from each other, respectively, and wherein a recessed portion is formed in a region between the first edges and the second edges; and a second tape having a length longer than the length of a full circumference of said endless belt and wound around said first tapes so as to extend along the recessed portion, wherein a winding end edge of said second tape overlaps a winding start edge of said second tape.

2. An endless belt according to claim 1, wherein said first tapes from a first layer to a (n−1)th layer are provided so that the first edges and the second edges do not overlap each other at a point X on the outer peripheral surface, and wherein the second tape of an n-th layer is wound around said first tapes.

3. An endless belt according to claim 2, wherein when a distance from the point X to the first edge of said first tape of a p-th layer is ypa, where p is an integer from 1 to (n−1), a distance from the point X to the second edge of said first tape of the p-th layer is ypb, and a distance from the point X to the winding start edge of said second tape of the n-th layer is yna, these distances satisfy both of formulas (1) and (2) below so that the first edges and the second edges of said first tapes of adjacent layers are not in the same position:

$$y1a<y2a< \ldots <y(n-1)a<yna, \text{ or}$$

$$y1a>y2a> \ldots >y(n-1)a>yna \quad (1)$$

$$y1b<y2b< \ldots <y(n-1)b<ynb, \text{ or}$$

$$y1b>y2b> \ldots >y(n-1)b>ynb \quad (2).$$

4. An endless belt according to claim 2, wherein said first tapes from the first layer to the (n−1)th layer and said second tape of the n-th layer are set to have different lengths.

5. An endless belt according to claim 2, wherein said second tape of the n-th layer is set to have a thickness thinner than a thickness of said first tapes from the first layer to the (n−1)th layer.

6. An endless belt according to claim 2, wherein said second tape of the n-th layer is set to have strength weaker than strength of said first tapes from the first layer to the (n−1)th layer.

7. A belt driving device comprising:

an endless belt according to claim 1; and a plurality of stretching rollers for stretching said endless belt, wherein said plurality of stretching rollers include a driving roller for providing a driving force to said endless belt.

8. A belt driving device according to claim 7, further comprising a contact member contacted to the end portions of said belt body, wherein said driving roller moves said endless belt in an opposite direction to a winding direction of said second tape.

9. An image forming apparatus comprising:

a belt driving device according to claim 7; and a toner image forming unit for temporarily forming a toner image on said endless belt before transfer onto a recording material or for forming the toner image on the recording material conveyed to said endless belt.

10. An endless belt comprising:

an endless belt body;

a plurality of first tapes each wound around and applied onto said belt body on an outer peripheral surface of each of end portions of said belt body with respect to a widthwise direction crossing a circumferential direction of said belt body, wherein each of said first tapes has a length, from a first end to a second end with respect to the circumferential direction, shorter than a length of a full circumference of said endless belt, and said first tapes are superposedly applied onto said belt body so that positions of first edges of said first tapes and positions of second edges of said first tapes are identical to each other, respectively, and wherein a recessed portion is formed in a region between the first edges and the second edges; and a second tape having a length longer than the length of a full circumference of said endless belt and wound around said first tapes in a belt state while extending along the recessed portion, wherein a winding end portion of said second tape overlaps a winding start portion of said second tape.

11. An endless belt according to claim 10, wherein said second tape is applied onto said first tapes so as to extend along a shape of the recessed portion.

12. An endless belt according to claim 2, wherein said second tape of the n-th layer is set to have a thickness equal to or thinner than a thickness of said first tapes from the first layer to the (n−1)th layer.

13. A belt driving device comprising:

an endless belt according to claim 10; and a plurality of stretching rollers for stretching said endless belt, wherein said plurality of stretching rollers include a driving roller for providing a driving force to said endless belt.

14. An image forming apparatus comprising:

a belt driving device according to claim 13; and a toner image forming unit for temporarily forming a toner image on said endless belt before transfer onto a recording material or for forming the toner image on the recording material conveyed to said endless belt.

15. A belt driving device comprising:

a movable endless belt body;

a plurality of stretching rollers configured to stretch said endless belt body, wherein said plurality of stretching rollers include a driving roller configured to provide a driving force to said endless belt body, and a tape which is wound around and applied superposedly onto said belt body through more than a full circumference on an outer peripheral surface of each of end portions of said endless belt body with respect to a widthwise direction crossing a circumferential direction of said endless belt body, wherein a slack portion in said tape is provided at a position corresponding to a winding start edge portion of said tape in a floating state relative to said belt body, and wherein the slack portion is provided so that a length of said tape at an outer circumference portion is longer than a length of said belt body at an inner circumference portion when said belt body at a position corresponding to the slack portion is wound around a minimum-diameter stretching roller of said plurality of stretching rollers.

16. A belt driving device according to claim 15, further comprising an elastic member other than said tape provided in the slack portion.

17. A belt driving device according to claim 15, wherein the slack portion is 2 mm or more with respect to the circumferential direction.

18. A belt driving device according to claim 15, further comprising a contact member contacted to the end portions of said belt body, wherein said driving roller moves said endless belt in an opposite direction to a winding direction of said tape.

19. An image forming apparatus comprising:

a belt driving device according to claim 15; and a toner image forming unit configured to temporarily form a toner image on said endless belt before transfer onto a recording material or to form the toner image on the recording material conveyed to said endless belt.

* * * * *